United States Patent [19]
Schmidt et al.

[11] Patent Number: 4,721,190
[45] Date of Patent: Jan. 26, 1988

[54] MECHANICAL ACTUATING DEVICE FOR SPOT-TYPE DISC BRAKES

[75] Inventors: Herbert Schmidt, Unterliederbach; Wilhelm Haberland, Frankfurt; Wolfgang Endler, Hofheim/Ts., all of Fed. Rep. of Germany

[73] Assignee: ITT Industries, Inc., New York, N.Y.

[21] Appl. No.: 442,342

[22] Filed: Nov. 17, 1982

Related U.S. Application Data

[63] Continuation of Ser. No. 201,942, Oct. 29, 1980, abandoned.

[30] Foreign Application Priority Data

Nov. 20, 1979 [DE] Fed. Rep. of Germany ....... 2946851

[51] Int. Cl.⁴ .................................................. F16D 65/56
[52] U.S. Cl. ................................... 188/71.9; 188/72.8; 188/196 D
[58] Field of Search ............... 188/71.8, 71.9, 72.7, 188/72.8, 196 D, 196 BA

[56] References Cited

U.S. PATENT DOCUMENTS

| 3,334,713 | 8/1967 | Russell | 188/196 BA |
| 3,361,232 | 1/1968 | Engle | 188/196 BA |
| 3,653,470 | 4/1972 | Travis | 188/71.9 |
| 3,942,827 | 3/1976 | Warlop et al. | 188/71.9 X |
| 3,991,859 | 11/1976 | Coulter et al. | 188/71.9 |
| 4,180,146 | 12/1979 | Airheart | 188/71.9 X |
| 4,278,152 | 7/1981 | Tosi | 188/72.8 X |

FOREIGN PATENT DOCUMENTS

| 1600182 | 11/1978 | Fed. Rep. of Germany | 188/71.8 |
| 1073829 | 6/1967 | United Kingdom | 188/71.9 |

Primary Examiner—George E. A. Halvosa
Attorney, Agent, or Firm—James B. Raden; Robert P. Seitter

[57] ABSTRACT

The mechanical actuating device for a disc brake has an automatic adjusting device to compensate for wear of the brake pads. The actuating device enables an easy resetting of the adjusting device for brake pad replacement and has a compact construction of all parts. The adjusting spindle extends axially through the actuating device and a clutch secures the adjusting spindle against rotation when the adjusting nut is turned to compensate for wear of the brake pads. To reset the adjusting device for brake pad replacement, the adjusting spindle is turned back by a turning tool.

9 Claims, 4 Drawing Figures

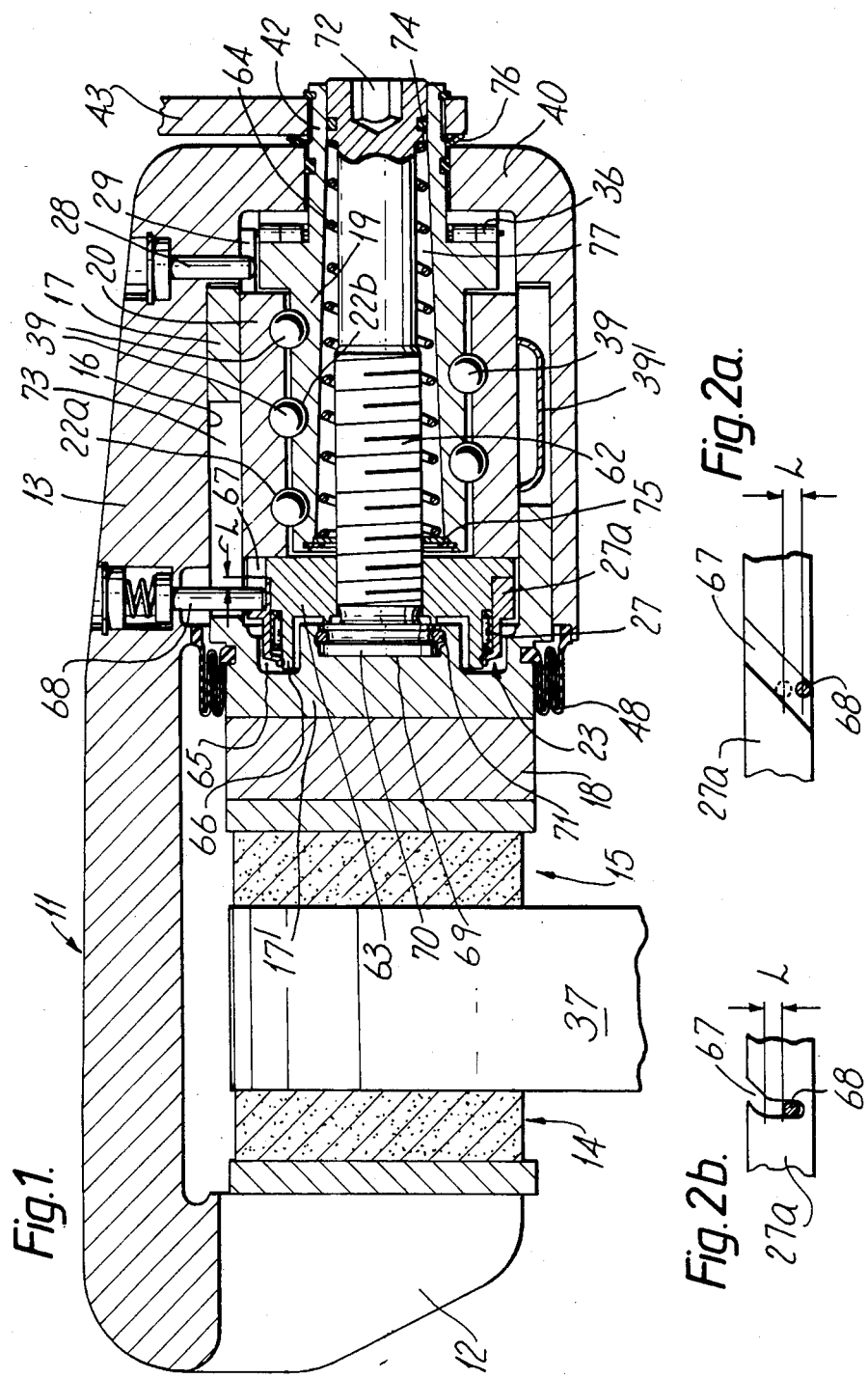

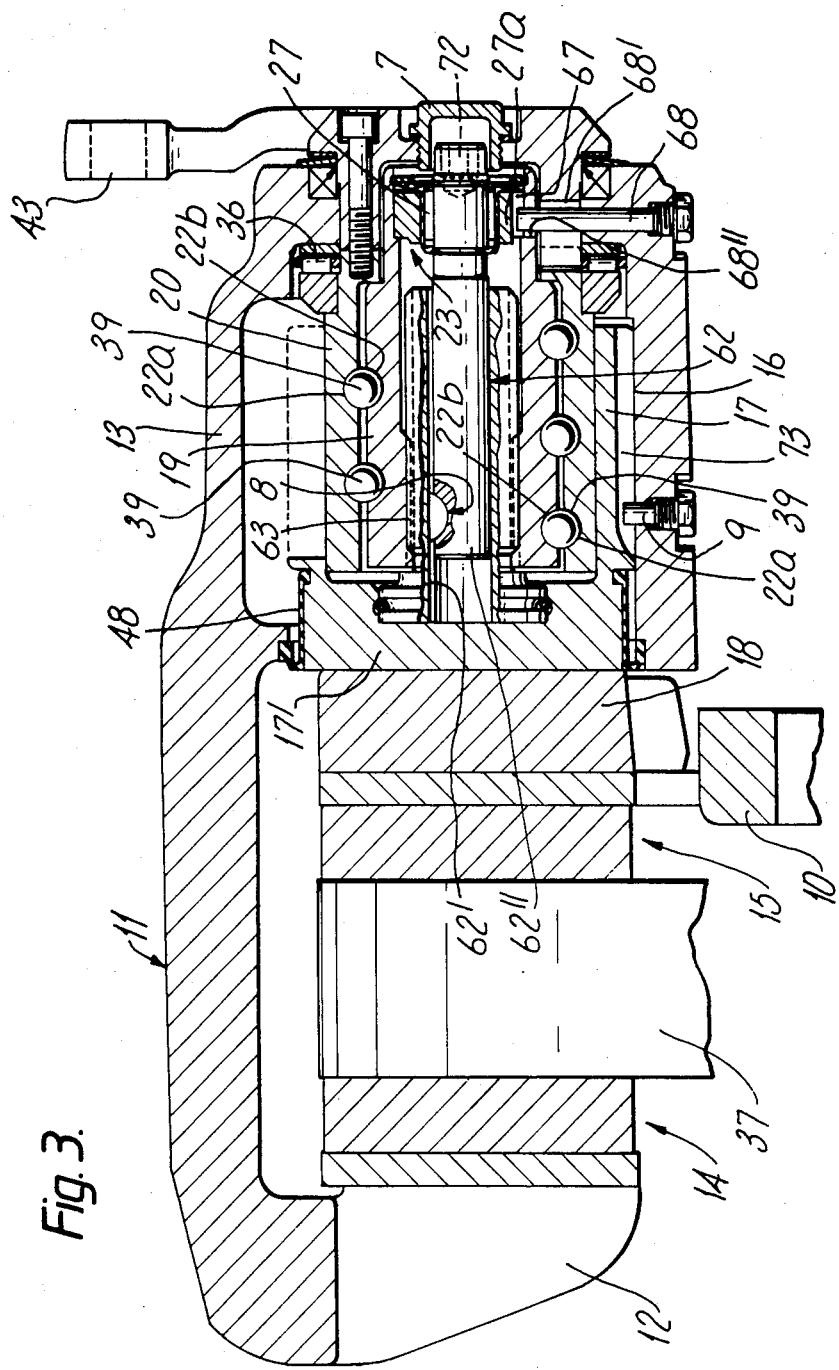

MECHANICAL ACTUATING DEVICE FOR SPOT-TYPE DISC BRAKES

CROSS-REFERENCE TO RELATED APPLICATION

This is a continuation of application Ser. No. 201,942, filed Oct. 29, 1980, now abandoned.

BACKGROUND OF THE INVENTION

The present invention relates to disc brakes and more particularly to a mechanical actuating device for spot-type disc brakes having a brake pad clearance adjusting device.

In a known spot-type disc brake adapted to be actuated both hydraulically and mechanically, for example, German Patent DE-AS No. 1,575,996, the brake piston is located freely movable axially on an actuating nut and for actuation is acted upon from the inside by an adjusting spindle cooperating with the adjusting device. In this known spot-type disc brake, it is required for the resetting of the adjusting device prior to a pad replacement to unscrew a screw cap and to take out a wedge. This method does not only involve intricate work, but also bears the risk of losing the unscrewed parts. Besides, the wedge may be jammed by corrosion, so that it cannot be removed without difficulties during brake pad replacement.

SUMMARY OF THE INVENTION

Therefore, it is an object of the present invention to provide a spot-type disc brake, in particular a fist-type caliper brake, in which the resetting of the adjusting device in the event of a pad replacement is allowed to take place by simply inserting a turning tool without the necessity of disassembling any parts. Moreover, the brake is constructed very compactly and does not include many components.

A feature of the present invention is the provision of a mechanical actuating device for a spot-type disc brake comprising a brake caliper embracing the periphery of a brake disc, the caliper having a cylindrical bore disposed in one leg thereof having a longitudinal axis parallel to an axis of rotation of the brake disc; an actuating spindle disposed in the cylindrical bore coaxial of the longitudinal axis; an actuating nut disposed in the cylindrical bore coaxial of the longitudinal axis encircling the actuating spindle, the actuating nut cooperating with the actuating spindle such that a brake shoe actuating member is advanced toward the brake disc when a relative axial displacement between the actuating spindle and the actuating nut occurs due to a relative rotation between the actuating spindle and the actuating nut caused by an actuating means coupled to one of the actuating spindle and the actuating nut; and an automatic brake pad clearance adjusting device disposed within the cylindrical bore including an adjusting spindle and an adjusting nut arrangement disposed in the cylindrical bore coaxial of the longitudinal axis, one end of the adjusting spindle being connected to the brake shoe actuating member, the adjusting spindle being immovable axial and rotatable against a resistance with respect to the brake shoe actuating member, and the other end of the adjusting spindle remote from the brake disc being accessible from the outside of the one leg and adapted to be turned, the adjusting nut having the axial displacement of the actuating nut and the actuating spindle transmitted thereto during a braking operation, and a clutch device disposed in the cylindrical bore coaxial of the longitudinal axis to drive the adjusting spindle and adjusting nut arrangement, the clutch device becoming effective when a nominal brake pad clearance is exceeded to advance the adjusting spindle toward the brake disc.

On account of this construction, the adjusting spindle is at all times accessible from the outside and is able to be reset to its initial position any time without the necessity of unscrewing or removing any components beforehand. Moreover, it is particularly advantageous that the entire actuating mechanism is a construction unit which can be pre-assembled as a whole and then inserted into the caliper's cylindrical bore.

In an embodiment, in which the actuating spindle is adapted to be turned around its axis by the actuating means, the present invention provides for the adjusting nut to be driven by the clutch device, which becomes effective upon exceeding the nominal brake pad clearance, to execute a rotary motion advancing the adjusting spindle to the brake shoe actuating member, and for the adjusting nut to be acted upon axially by the actuating nut located in the cylindrical bore locked against rotational movement but axially movably, and for the substantially sleeve-like actuating spindle to extend radially between the adjusting spindle and the actuating nut. Due to this construction, the clutch device and the adjusting nut are permitted to be accommodated very compactly in one radial plane, while the actuating nut and the actuating spindle are allowed to be housed axially displaced but likewise in a space-saving way. The actuating force is transmitted to the adjusting nut by as large a surface as possible.

In a particularly favorable embodiment, the adjusting spindle is subjected to a spring in the direction leading away from the brake shoe actuating member. Thus, the piston is reset to its initial position after an actuation or upon the resetting of the adjusting device. A relatively long spring, constructed in particular as a compression spring, may be accommodated in a compact, space-saving manner by arranging it in a substantially annular space between the adjusting spindle and the actuating spindle. To accomplish this, the spring preferably bears against the actuating spindle and extends from the end portion of the actuating spindle close to the brake shoe actuating member to the end portion of the adjusting spindle remote from the brake shoe actuating member.

Advantageously, the adjusting nut includes adjacent the outer periphery thereof a collar engaging in an annular indentation of the brake shoe actuating member, the collar carrying on the outer surface thereof a one-way clutch which is a component of the clutch device. The driven part of the one-way clutch includes an inclined groove receiving a radial peg fastened to the caliper leg. The inclined groove has a portion thereof dimensioned to correspond to the nominal brake pad clearance. Thus, the axial portion of the inclined groove determines the brake pad clearance, while the inclined portion resets the one-way clutch a distance corresponding to the necessary adjustment upon exceeding the nominal brake pad clearance during a clamping or braking movement. When the brake is released, the one-way clutch entrains the adjusting nut to execute an adjusting rotary motion which displaces the adjusting spindle accordingly in the direction of the brake disc.

In the embodiment described so far, it is possible to turn the adjusting spindle back without any additional measures because the one-way clutch cooperates with the adjusting nut. As a result, the resetting operation necessary for brake pad replacement is allowed to be carried out in a particularly simple way.

The present invention may also be utilized in a spot-type disc brake in which the actuating nut is turned around its axis by the actuating means. The present invention provides in this case for the adjusting spindle to be driven by a clutch device, which becomes effective upon exceeding the nominal brake pad clearance during a brake application, to execute a rotary motion advancing the adjusting spindle toward the brake shoe actuating member, and for the adjusting nut to cooperate with the actuating spindle in the form of a substantially sleevelike member located in the cylindrical bore inside the adjusting spindle, locked against rotational movement but axially movable in the cylindrical bore, between the adjusting spindle and the actuating nut.

By the actuating spindle and the adjusting nut being integrally constructed, this embodiment is characterized by a particularly compact constuction. In addition, the construction contributes to an especially economical manufacture thereof. Nevertheless, the adjusting spindle remains accessible from the outside in the desired manner. In the herein described second main embodiment of the present invention, all fundamental actuating elements are coaxially disposed in each other. Provided at the adjusting spindle, i.e. preferably at its end portion remote from the brake disc, is a one-way clutch, which is a component of the clutch device. The driven part of the one-way clutch includes an inclined groove receiving a radial peg through a circumferential slot in the actuating nut and an opening in the actuating spindle, the peg being fastened to the caliper leg. The inclined groove has a portion thereof dimensioned to correspond to the nominal brake pad clearance. The circumferential slot is dimensioned such that the actuating nut's rotary motion occurring during a brake application is not inhibited.

The width of the opening in the actuating spindle corresponds in the circumferential direction approximately to the diameter of the radial peg. Thereby, the radial peg forms simultaneously the rotation-preventing mechanism for the actuating spindle, so that the necessity of using a special structural element for this purpose is obviated.

In another very important embodiment, the adjusting spindle is composed by two components connected to prevent relative rotation thereby, but axially movable relative to each other, one components of which is connected to the brake shoe actuating member to enable relative rotation therebetween, against a resistance, but preventing relative axial movement therebetween, while the other component is connected with the clutch device to prevent relative axial movement therebetween, the clutch device in turn being connected to the actuating spindle to prevent relative axial movement therebetween. This way, the balance in length between the adjusting spindle's two components, becoming necessary upon an adjusting rotary motion of the adjusting spindle, will be realized in a simple manner.

It is particularly favorable if the brake shoe applying member is the bottom of a piston located axially movable but preferably non-rotatably in the cylindrical bore and accommodating in its cylindrical inner space the actuating nut constructed to cylindrically fit in the inner space. In this embodiment, the radial peg fastened to the caliper leg and engaged in the inclined groove extends through a longitudinal slot in the piston wall so that the piston's movement is not inhibited. This embodiment affords the advantage that all components of the actuating mechanism can be pre-assembled within the piston prior to being inserted in the brake caliper as a single construction unit.

BRIEF DESCRIPTION OF THE DRAWING

Above-mentioned and other features and objects of this invention will become more apparent by reference to the following description taken in conjunction with the accompanying drawing, in which:

FIG. 1 is a longitudinal cross-sectional view of a first embodiment of a flat-type caliper brake in accordance with the principles of the present invention;

FIGS. 2a and b are top views of a one-way clutch ring in the area of the inclined groove contained in the embodiments of FIGS. 1 and 3; and FIG. 3 is a longitudinal cross-sectional view of a second embodiment of a fist-type caliper in accordance with the principles of the present invention, in which—in contrast to the embodiment of FIG. 1—the actuating nut and not the actuating spindle is turned by the actuating means.

DESCRIPTION OF THE PREFERRED EMBODIMENTS

Referring to FIG. 1, a fist-type caliper 11 axially embraces the outer periphery of a brake disc 37. Leg 12 located on the outboard side of disc 37 carries the indirectly actuated outboard brake shoe 14. The directly actuated inboard leg 13 of fist-type caliper 11 includes an axial bore 16. A cylindrical piston 17 with a bottom 17' close to brake disc 37 is located axially movable in bore 16. The brake shoe actuating member 17' formed by the bottom of piston 17 acts on a large area of an intermediate plate 18 communicating with inboard brake shoe 15.

Located in the central area of brake shoe actuating member 17' at the side remote from intermediate plate 18 is a cylindrical recess 69. A coupling portion 70 of the adjusting spindle 62 engages recess 69. Included in the circumferential surfaces of recess 69 and coupling portion 70 are semicircular annular identations, in which a circlip 71 is inserted to axially couple the two parts together.

Adjusting spindle 62 extends in a direction away from brake disc 37 and through the front wall 40 of leg 13 to the outside thereof. At this location a hexagonal opening 72 is provided in the end surface or spindle 62 to receive a turning tool.

Spaced radially away from recess 69 an annular indentation 65 is provided in brake shoe actuating member 17'. Identation 65 receives a collar 66 extending axially from an adjusting nut 63, which is screwed onto the external thread of the adjusting spindle 62 adjacent to brake shoe actuating member 17'. The thread of adjusting spindle 62 extends from coupling portion 70 to about half of its length along the required adjusting length area.

Arranged radially outward on collar 66 is a one-way clutch 27 including a ring 27a turnable in one direction only. Ring 27a includes an inclined groove 67 shown in FIGS. 1 and 2a. A radial peg 68 extending from leg 13 engages groove 67 through a longitudinal slot 73 in piston 17. Peg 68 is dimmensioned smaller than inclined groove 67 by an amount so as to move axially freely in groove 67 within the range of the nominal brake pad clearance L.

At a surface adjacent the outer periphery, adjusting nut 63 is axially acted upon by an actuating nut 20, which is located axially movable within the cylindrical cavity of piston 17. A bolt 28 projecting radially inward from leg 13 engages in a longitudinal slot 29 of actuating nut 20 and, thus, secures actuating nut 20 against rotation without inhibiting its axial slidability in the normal actuating range.

Arranged inside of the annular actuating nut 20 is a sleeve-like actuating spindle 19, actuating nut 20 and actuating spindle 19 are in engagement with each other through a ball bearing thread 22a and 22b and balls 39. The ball guide return tube 39' is indicated schematically in a recess of piston 17.

Actuating spindle 19 encompasses adjusting spindle 62 leaving a gap 77 therebetween and extends with a hollow actuating shaft 42 through wall 40 of leg 13 to the outside, where an actuating lever 43 is fastened thereto.

A compression spring 64 constructed slightly conical extends in gap 77 between a bearing bracket for spring bar 74 at the outer end portion of adjusting spindle 62 and a bearing bracket for spring bar 75 provided at the inner end portion of actuating spindle 19.

Additionally, a bellow-like sealing diaphragm 48 is fastened, annularly, on one hand, to piston 17 adjacent member 18 and, on the other hand, to caliper 11 in order to prevent dirt or water from leaking into the actuating mechanism.

The fist-type caliper brake described above operates as follows.

When actuating lever 43 is pivoted in the actuating direction, actuating spindle 19 will advance actuating nut 20 axially in the direction of brake shoe actuating member 17' via the ball bearing thread 22a and 22b. When this occurs brake shoe actuating member 17' is advanced in the direction of brake disc 37 via adjusting nut 63 and adjusting spindle 62 so that brake shoes 14 and 15 will abut and clamp (brake) brake disc 37.

During this braking operation radial peg 68 moves axially free within inclined groove 67. The distance L covered corresponds to the nominal brake pad clearance of the brake. If the displacement travel of piston 17 is somewhat increased due to a brake pad wear, radial peg 68 will abut an inclined wall of groove 67 (see FIG. 2a) and will turn one-way clutch ring 27a by an amount corresponding to the amount the nominal brake pad clearance L has been exceeded.

When the braking operation is terminated, actuating nut 20 will move back and adjusting nut 63 will be likewise reset to its initial position by spring 64 via adjusting spindle 62. Piston 17 will also be entrained in this case. Radial peg 68 will now abut the opposite inclined wall of groove 67 and entrains adjusting nut 63 in the desired adjusting direction, since one-way clutch 27 is locked in this direction. On account of the adjusting thread between spindle 62 and nut 63 being suitably constructed, adjusting spindle 62 is screwed out of nut 63 in the direction of brake disc 37.

The above adjusting steps will be effected until radial peg 68 moves during a braking operation into the free or uninclined space of groove 67.

An axial roller bearing or a needle bearing 36 is provided between an end surface of actuating spindle 19 and wall 40 for transmitting the clamping or braking forces with a lowest possible content of friction to wall 40 of leg 13. A displacement of actuating spindle 19 inwardly is inhibited by a cup spring 76 disposed between actuating lever 43 and wall 40.

In the event brake pad replacement becomes necessary due to pad wear, the resetting of adjusting spindle 62, having been moved in the direction of disc 37 after several adjusting operations, may be achieved simply by inserting a turning tool in the hexagonal opening 72 and turning this tool around the axis of spindle 62 so as to screw spindle 62 out of adjusting nut 63 into its initial position.

All components of the actuating mechanism are arranged in piston 17 in such a manner that—with the actuating lever 43 dismantled and the radial peg 68 not yet inserted—piston 17 including the actuating and adjusting mechanism arranged therein can be inserted in bore 16 completely pre-assembled.

It is furthermore particularly significant that the coupling between brake shoe actuating member 17' and coupling portion 70 is effected via circlip 71 such that a sufficient friction prevails between these two parts when the adjusting step takes place at adjusting nut 63. In this case the friction is sufficient to prevent adjusting spindle 62 turning together with adjusting nut 63. On the other hand, the rotational friction between the coupling portion 70 and brake shoe actuating member 17' is only allowed to have a value such that a rotary motion is possible between coupling portion 70 and brake shoe actuating member 17' when resetting adjusting spindle 62 by means of the turning tool inserted in hexagonal opening 72 without being required to overcome too great a resistance. The turning ability between adjusting spindle 62 and brake shoe actuating member 17' with a large friction resistance is necessary only for the resetting in the event of the pad replacement.

In the embodiment shown in FIG. 3, like reference numerals designate like parts as in the FIGS. 1 and 2.

In addition to the embodiment of FIG. 1, the brake support member 10 is indicated as well.

In contrast to the embodiment shown in FIG. 1, the swivelling actuating lever 43 is connected with actuating nut 20 locked to each other against relative rotational movement. Accordingly, actuating nut 20 rotates within piston 17. Piston 17, on its part, is secured against rotation by a rotation-preventing pin 9 screwed into leg 13 and engaging in an axial slot 73 of piston 17 provided at the outer periphery thereof. Actuating nut 20 bears against leg 13 via needle bearing 36 for transmitting the clamping or brake forces to the caliper.

Actuating spindle 19 is located coaxilly within the actuating nut 20 and is secured against rotation by means of a radial peg 68 screwed radially in leg 13, radial peg 68 engaging in an axial opening 68" of the actuating spindle 19, the width of opening 68 corresponding to the diameter of the radial peg 68.

Actuating spindle 19 is constructed hollow and provided with a thread corresponding to adjusting nut 63 at its inner area close to brake shoe actuating member 17'. At this position, actuating spindle 19 is in screw-threaded engagement with adjusting spindle 62. Adjusting spindle 62 is located coaxially within actuating spindle 19 and includes two components 62' and 62". Adjusting spindle component 62' is connected with brake shoe actuating member 17' rotatable against a resistance, but axially tight thereagainst. Spindle component 62' is constructed hollow, so that there is space therein to accommodate pin-shaped adjusting spindle component 62". Component 62" is in communication with component 62' through a feather key connection 8. Consequently, the two adjusting spindle components 62' and 62" are interconnected for axial movement, but locked with each other to prevent relative rotational movement.

Adjusting spindle component 62" projects in a direction remote from brake shoe actuating member 17' out of the other component 62' and includes at its end portion hexagonal opening 72 accessible from the outside for insertion of a turning tool. Component 62' carries the adjusting thread on the outer surface thereof. Opening 72 is covered at the outside by an easily removable cap 7.

In the area between the end portion of the adjusting spindle component 62' and actuating lever 43, clutch device 23 is located on spindle component 62", clutch device 23 including a one-way clutch 27. The outer part 27a of one-way clutch 27 is in rotational connection with the inner wall of actuating spindle 19 spaced from the adjusting thread. One-way clutch 27 communicates axially immovable with both adjusting spindle component 62" and actuating spindle 19.

Inclined groove 67 shown in FIG. 2a is provided in driven part 27a of one-way clutch 27 in the embodiment of FIG. 3. The rotation-preventing radial peg 68 for actuating spindle 19 engages likewise in inclined groove 67.

On account of the coaxial arrangement of the individual elements in the embodiment of FIG. 3, radial peg 68 has to penetrate through a circumferential slot 68' in actuating nut 20. Thereby, the rotary motion of actuating nut 20 is not hindered by radial peg 68.

The mode of operation of the embodiment of FIG. 3 is analogous to that of FIG. 1. When actuating lever 43 is turned, actuating nut 20 will turn and advance piston 17 via actuating spindle 19 and adjusting spindle component 62'. Thereby, radial peg 68 moves axially within inclined groove 67.

As soon as the clearance L is exceeded during an actuation, radial peg 68 arrives at the inclined wall of inclined groove 67. One-way clutch 27 will be turned by this means. The rotary motion will be transmitted via one-way clutch 27 to adjusting spindle components 62" and 62', so that an adjusting step is done including adjusting spindle 62 being turned out of actuating spindle 19 via the adjusting thread. Since merely an axial adjustment of the adjusting spindle component 62' takes place, an axial displacement will be required relative to the other component 62" via feather key connection 8.

When worn brake pads are to be replaced, the adjusting device is reset by removing cap 7 and inserting a turning tool in hexagonal opening 72. Then radial peg 68 is screwed out far enough to release it from inclined groove 67 of one-way clutch 27. Adjusting spindle component 62' can now be turned back into actuating spindle 19 again by a corresponding rotary motion of the tool.

Instead of a wide groove 67 according to FIG. 2a, it is also possible to use a groove 67 having a width corresponding to the diameter of peg 68 as shown in FIG. 2b, this groove including an inclined area serving for the adjustment and an axial area determining the brake pad clearance L.

While we have described above the principles of our invention in connection with specific apparatus, it is to be clearly understood that this description is made only by way of example and not as a limitation to the scope of our invention as set forth in the objects thereof and in the accompanying claims.

We claim:

1. A mechanical actuating device for a spot-type disc brake comprising:
    a brake caliper embracing the periphery of a brake disc, said caliper having a cylindrical bore disposed in one leg thereof having a longitudinal axis parallel to an axis of rotation of said brake disc;
    an actuating spindle disposed in said cylindrical bore coaxial of said longitudinal axis;
    an actuating nut disposed in said cylindrical bore coaxial of said longitudinal axis encircling said actuating spindle, said actuating nut cooperating with said actuating spindle such that a brake shoe actuating member is advanced toward said brake disc when a relative axial displacement between said actuating spindle and said actuating nut occurs due to a relative rotation between said actuating spindle and said actuating nut caused by an actuating means coupled to one of said actuating spindle and said actuating nut; and
    an automatic brake pad clearance adjusting device disposed within said cylindrical bore including:
    an adjusting spindle and an adjusting nut arrangement disposed in said cylindrical bore coaxial of said longitudinal axis, one end of said adjusting spindle being connected to said brake shoe actuating member for axial movement therewith during a braking operation, said actuating spindle being immovable axially and being rotatable against a resistance with respect to said brake shoe actuating member, and the end of said adjusting spindle remote from said brake disc being accessible from the outside of said one leg and adapted to be turned for adjustment thereof, said adjusting nut having said axial displacement of said actuating nut and said actuating spindle transmitted thereto during a braking operation, means for restoring said adjusting spindle on release of said actuating means, said restoring means comprising a compression spring bearing against said adjusting spindle and actuating spindle, and
    a unidirectional clutch device disposed in said cylindrical bore coaxial of said longitudinal axis in an operative relationship with said adjusting nut and with a radial peg extending through a wall of said cylindrical bore to drive said adjusting spindle and adjusting nut arrangement, said clutch device being entrained with said adjusting spindle and adjusting nut to advance said adjusting spindle toward said brake disc when a nominal brake pad clearance is exceeded.

2. An actuating device according to claim 1, wherein said actuating spindle is rotated about its axis by said actuating means and has a sleeve-like configuration disposed between said adjusting spindle and said actuating nut, and
    said adjusting nut is driven by said clutch device and is acted upon axially by said actuating nut locked in said cylindrical bore to prevent rotation thereof but to enable axial movement thereof.

3. An actuating device according to claim 1, wherein said spring is disposed in an annular space between said adjusting spindle and said actuating spindle.

4. An actuating device according to claim 3, wherein said spring has one end thereof bearing against said actuating spindle adjacent said brake disc and the other end thereof bearing against said adjusting spindle remote from said brake disc.

5. An actuating device according to claim 4, wherein said adjusting nut is disposed adjacent said brake shoe actuating member and includes an axially extending collar engaging an annular indentation in said brake shoe actuating member, said collar supporting on the outer surface thereof said clutch device in the form of a oneway clutch.

6. An actuating device according to claim 5, wherein said one-way clutch includes a driven part having an inclined groove receiving said radial peg, said groove having a dimension thereof corresponding to said nominal clearance.

7. An actuating device according to claim 6, wherein said brake shoe actuating member is a closed end of a hollow cylindrical piston disposed axially movable, but non-rotatable in said cylindrical bore coaxial of said longitudinal axis enclosing and substantially coextensive with said adjusting spindle, said adjusting nut, said actuating spindle and said actuating nut.

8. An actuating device according to claim 7, wherein said radial peg extends through a longitudinal slot of said piston to prevent rotation thereof, but enabling axial movement thereof.

9. An actuating device according to claim 1, wherein said brake shoe actuating member is a closed end of a hollow cylindrical piston disposed axially movable, but non-rotatable in said cylindrical bore coaxial of said longitudinal axis enclosing and substantially coextensive with said adjusting spindle, said adjusting nut, said actuating spindle and said actuating nut.

* * * * *